United States Patent [19]

Bergeron

[11] 4,171,636

[45] Oct. 23, 1979

[54] ENGINE CYLINDER HEAD PRESSURE TEST PLATES

[76] Inventor: Leonard H. Bergeron, 6226 Cleveland, El Paso, Tex. 79905

[21] Appl. No.: 851,721

[22] Filed: Nov. 15, 1977

[51] Int. Cl.[2] ............................................. G01M 3/04
[52] U.S. Cl. .................................................. 73/49.7
[58] Field of Search ................... 73/47, 40, 49.7, 49.8, 73/118, 119 R

[56] References Cited

U.S. PATENT DOCUMENTS

| | | | |
|---|---|---|---|
| 3,145,560 | 8/1964 | Williams | 73/49.7 |
| 3,360,984 | 1/1968 | Salsbury et al. | 73/49.7 |
| 3,452,591 | 7/1969 | Phillips et al. | 73/118 |
| 3,561,255 | 2/1971 | Kostielney, Jr. | 73/49.7 X |
| 3,608,369 | 9/1971 | Wilkinson | 73/119 R |
| 3,751,978 | 8/1973 | Crawford | 73/49.7 |
| 3,973,429 | 8/1976 | Durgan et al. | 73/49.7 |

OTHER PUBLICATIONS

Detroit Diesel V-71 Assembly Manual; General Motors Corporation; p. 5; Sep. 1974.

Primary Examiner—John Petrakes
Attorney, Agent, or Firm—Berman, Aisenberg & Platt

[57] ABSTRACT

Testing apparatus which permits precise determination of the existence and location of possible fractures and cracks in the cylinder head of an engine. In a preferred embodiment, the apparatus comprises a plurality of individual test plates which are specially designed for the particular engine desired to be tested. The plates include at least one planar surface having one or a plurality of generally circular recesses formed therein for holding and retaining O-ring seals. The position of the recesses on the plate corresponds to the position of water conduit outlets in the cylinder head. The preferably transparent plates, along with the O-ring seals, are bolted onto the cylinder head, and water under pressure is then applied. The reverse side of the plates may conveniently include a different arrangement of recesses to accommodate a different engine cylinder head design.

19 Claims, 11 Drawing Figures

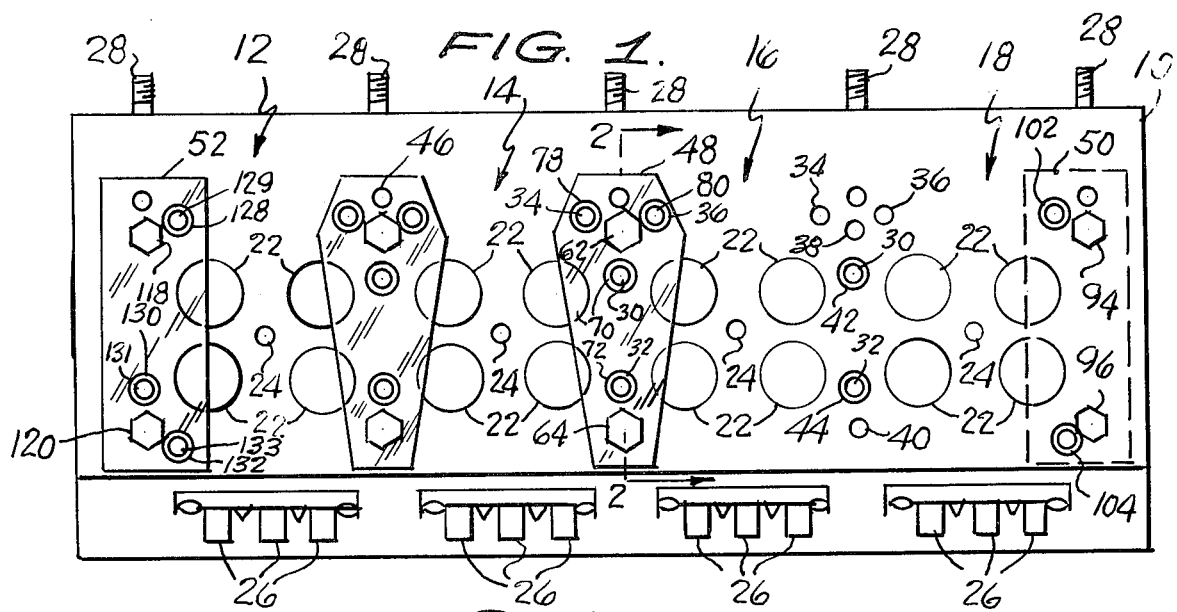
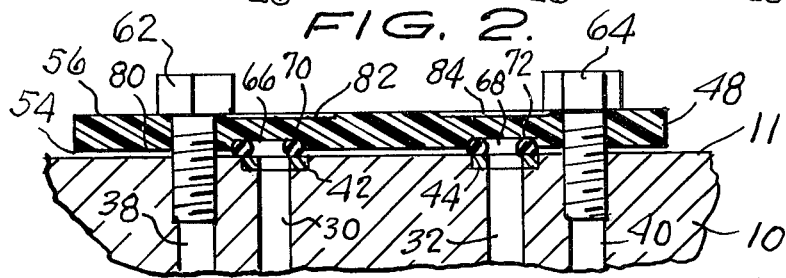
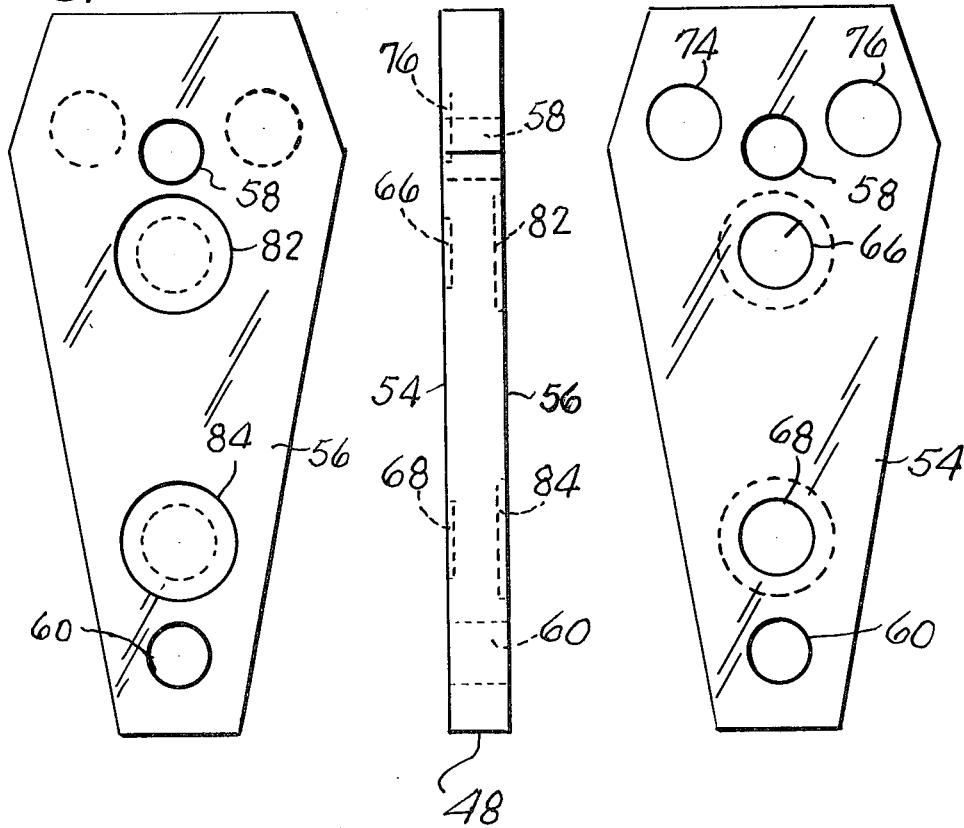

ENGINE CYLINDER HEAD PRESSURE TEST PLATES

BACKGROUND OF THE INVENTION

1. Field of The Invention

The present invention is related to automotive test apparatus and, more particularly, is directed towards means for permitting the precise determination of the existence and location of fractures in the cylinder head of an engine.

2. Description of The Prior Art

It is known that cylinder heads of internal combustion engines may crack or fracture under excessive heat conditions. Recently, the cylinder heads of diesel engines, in particular, have been experiencing a high degree of fractures and cracks, which have been the result of increased power in such engines through the use of superchargers and the like which have, in turn, resulted in extreme heat conditions being imposed on the engine.

Generally, the cracks and fractures are minute, and are therefore impossible to detect by the human eye. It is known in the art to test such cylinder heads for the existence of minute fractures and cracks by subjecting them to a high pressure testing procedure.

In this procedure, the cylinder head is first dismantled from the cylinder block. The cylinder head itself contains a plurality of interconnected water conduits which conduct coolant through the head during normal operation. During testing for cracks and fractures, the water channels and conduits are grouped in sets, and each set is sealed by a single large gasket and cover member, while water under pressure is applied to one of the water channels that serves as an inlet conduit. The operator then visually inspects the head for water leakage, which would be indicative of a crack or fracture.

One problem with the prior art testing apparatus described above is that the unduly large cover and gasket for each set of water conduits can prevent detection of the existence of a fracture in the areas between the water conduits within a set, i.e., the area under the cover and gasket. In this case, the gasket tends to act as a seal to prevent any leakage from being detected.

If in fact there exists a fracture, and it goes undetected, the engine when put back in service can suffer very extensive damage as a result of water commingling with the oil.

Additionally, with the prior art apparatus, even if a fracture or crack under the gasket and cover member is detected, it is impossible to determine the precise location of the fracture in order that it might be repaired.

It may be appreciated from the foregoing that a great need exists for an inexpensive, easy to use apparatus for positively determining both the existence and location of minute fractures in engine cylinder heads.

United States patents in this general area area of which I am aware include the Wilkinson U.S. Pat. No. 3,608,369 and the Durgan et al U.S. Pat. No. 3,973,429. The latter patent teaches a rather complicated testing apparatus for engine heads which is designed to accommodate virtually any internal combustion head on the market for testing purposes. The former patent teaches an engine head test stand which includes a support plate having sealer elements which are adapted to be received in openings in the engine head.

However, neither of the foregoing references solve the problem towards which the present invention is advanced in an economical manner.

OBJECTS AND SUMMARY OF THE INVENTION

It is therefore a primary object of the present invention to provide apparatus for use in testing an engine cylinder head under fluid pressure to locate possible fractures in the head, and which overcomes all of the disadvantages noted above with respect to prior art devices and techniques.

A further object of the present invention is to provide an engine cylinder head testing apparatus which permits precise determination of the existence and location of minute fractures in engine cylinder heads.

An additional object of the present invention is to provide an engine cylinder head pressure test apparatus which utilizes readily available components that are specially designed for the particular engine under test, and which may be readily and inexpensively manufactured so as to be made widely available at an economical cost.

The foregoing and other objects are attained in accordance with one aspect of the present invention through the provision of apparatus for use in testing an engine cylinder head under fluid pressure to locate possible fractures in the head. The cylinder head includes a plurality of interconnected water conduits and a plurality of bores adapted to receive bolts secured by nuts for attaching the cylinder head to the cylinder block. The apparatus comprises a plurality of test plate means for covering the water conduits, each of the test plate means comprising a substantially rigid, transparent plate having at least two through apertures each adapted to receive one of the bolts for fastening the plate through at least two of the bores in the head. The plate has one side which comprises a substantially planar surface positioned in use adjacent but spaced from the cylinder head and including recessed means formed therein for receiving means for sealing those of the water conduits which are covered by the plate.

In accordance with more specific aspects of the present invention, the recessed means formed in the planar surface of the plate comprises at least one substantially circular recess which is positioned on the planar surface of the plate in concentric alignment with at least one of the water conduits in the cylinder head during use. The sealing means more particularly preferably comprises an O-ring gasket adapted to be fitted within the substantially circular recess. The thickness of the gasket is preferably greater than the depth of the recess, whereby the gasket will project above the planar surface of the recess when installed therein. The recess is preferably of a diameter slightly larger than that of the water conduit with which it is concentric.

In accordance with still more detailed aspects of the present invention, the recessed means further comprises a plurality of substantially circular recesses, each positioned on the planar surface of the plate in concentric alignment with one of the water conduits in the cylinder head during use.

In accordance with other aspects of the present invention, the reverse side of the substantially rigid, transparent plate comprises a second substantially planar surface which includes further recessed means formed therein for receiving further sealing means. More particularly, the recessed means formed in the first side of the plate are positioned thereon for use with one particular cylinder head design, while the recessed means on the reverse side of the plate are positioned thereon for use with a different cylinder head design. For example, one side of the plates may have recesses positioned thereon for mounting on a series 92 Detroit diesel engine cylinder head, while the reverse side of the plate has recesses positioned thereon for corresponding to the water conduits formed in a series 71 Detroit diesel engine cylinder head.

BRIEF DESCRIPTION OF THE DRAWINGS

Various objects, features and attendant advantages of the present invention will be more fully appreciated as the same become better understood from the following detailed description of the present invention when considered in connection with the accompanying drawings, in which:

FIG. 1 is a side view in elevation of the preferred embodiment of the present invention shown mounted on a cylinder head preparatory to fluid pressure testing thereof;

FIG. 2 is an enlarged, partial cross-sectional view of the preferred embodiment illustrated in FIG. 1 and taken along line 2—2 thereof;

FIG. 3 is a plan view of one side of a preferred embodiment of the present invention;

FIG. 4 is a side view of the preferred embodiment illustrated in FIG. 3;

FIG. 5 is a plan view of the rear surface of the preferred embodiment illustrated in FIGS. 3 and 4;

DETAILED DESCRIPTION OF THE PREFERRED EMBODIMENTS

Figure 6:
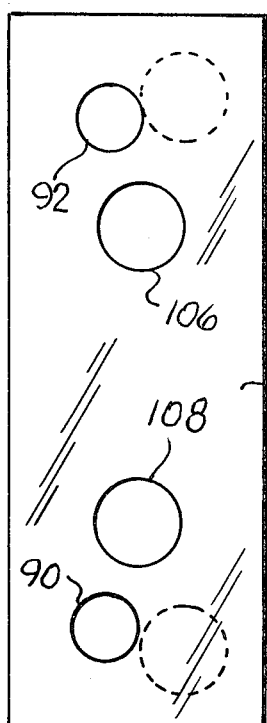
FIG. 6 is a plan view of the front side of an alternative embodiment of the present invention.

Referring now to the drawings, wherein like reference numerals indicate identical or corresponding parts throughout the several views, and more particularly to FIG. 1 thereof, reference numeral 10 indicates a cylinder head for a four-valve V-8 diesel engine. More particularly, cylinder head 10 is intended to be representative, for the sake of example and illustration, of a cylinder head for a diesel engine known as the "92 series" Diesel engine, as manufactured by Detroit Diesel. As will become more clear hereinafter, the particular embodiments of the present invention disclosed are particularly designed for use in connection with the "92 series" and "71 series" Detroit diesel engines, as well as with the "71 series" General Motors Corporation diesel engine cylinder heads. It should be clear to a person of ordinary skill in the art, however, that the underlying concept of the present invention may in fact be expanded and applied to any cylinder head of an internal combustion engine requiring fluid pressure testing for locating fractures or cracks.

The cylinder head 10 consists of a one-piece casting which is securely held to the cylinder block of the engine by special bolts. For each engine, two such cylinder heads are provided, one on each cylinder bank.

Located in the cylinder head 10 are exhaust valves 22, fuel injectors 24 and a cam follower 26 for each cylinder. It may be appreciated that the exhaust valves 22 for the cylinder head 10 are provided, for the four-valve, V-8 engine illustrated, in four sets indicated generally by reference numerals 12, 14, 16 and 18. Projecting from the top of head 10 are exhaust manifold studs 28 which are connected to the exhaust passages of the exhaust valves.

Positioned between the adjacent sets 12, 14, 16 and 18 of exhaust valves 22, as well as at the ends of cylinder head 10, are a series of water nozzles and holes for directing the comparatively cool engine coolant at high velocity towards the sections of the cylinder head which are subjected to the greatest heat.

More particularly, for example, positioned between valve sections 16 and 18 are a pair of water nozzles 30 and 32 which are commonly provided with individual brass fittings 42 and 44, respectively. Positioned just above and below the water nozzles 30 and 32 are a pair of bores 38 and 40, respectively, which are provided for mounting the cylinder head 10 to the cylinder block by special bolts and nuts. The spacing between the bores 38 and 40 is identical for both the series 71 and series 92 diesel engines (approximately 4¾ inches), which permit the test plates of the present invention to be utilized interchangeably in the testing procedure to be described in greater detail hereinafter.

Positioned above the upper bore 38, and to the left and right thereof, are an additional pair of water holes or conduits 34 and 36, respectively.

The structural layout of water nozzles 30 and 32, bores 38 and 40, and water holes 34 and 36, is repeated between valve sets 12 and 14, as well as between valve sets 14 and 16, wherein like reference numerals indicate identical or corresponding parts. Different configurations of water nozzles obtain, however, at the respective ends of cylinder head 10, although the inter-bore spacing is the same, as will become more clear hereinafter.

Shown mounted between valve sets 12 and 14, and between valve sets 14 and 16, are a pair of substantially identical test plates of the present invention indicated by reference numerals 46 and 48, respectively. In an actual test setup, another plate 48 would be mounted to the bores 38 and 40 over the conduit structure between valve sets 16 and 18, but is not shown in FIG. 1 for the sake of explanation and illustration.

Mounted at the right and left ends of cylinder head 10 over the respective water conduit structures positioned thereat are another pair of test plates indicated by numerals 50 and 52, respectively. Test plates 50 and 52 are illustrated in greater detail in FIGS. 8 and 9, respectively, which will be described more fully hereinafter.

Referring now to FIGS. 3 through 5, the test plate 48 of FIG. 1 is illustrated in rear, side and front views, respectively. Test plate 48 is preferably comprised of a transparent, rigid plastic material, such as for example plexiglass, lucite, or the like. The plate 48 includes two substantially planar, parallel sides 54 and 56, each of which may be designed and adapted for use on a different engine cylinder head. For example, side 54 of plate 48, illustrated in plan view in FIG. 5, is particularly designed for use on the "92 series" Detroit Diesel engine cylinder heads, while the reverse side 56, illustrated in plan view in FIG. 3, is designed to be utilized in connection with the "71 series" Detroit Diesel engine cylinder heads. As stated hereinabove, the provision of identical inter-bore spacing on the 71 and 92 series cylinder heads lends itself to the versatility of plate 48 as afore-described.

Referring now to FIG. 5, there is illustrated side 54 which is, in use in FIG. 1, immediately adjacent but spaced from the upper surface 11 of cylinder head 10 (see FIG. 2). Surface 54 includes a pair of through holes 58 and 60, preferably ⅝ inch in diameter, for alignment with the bores 38 and 40. Positioned through holes 58 and 60 are a pair of retaining bolts 62 and 64, respectively, for securing the plate 48 to the head 10.

Also formed on surface 54 of plate 48 are a pair of similar spaced recesses 66 and 68 each of which are adapted to receive a sealing gasket, preferably in the form of an O-ring 70 and 72 (FIGS. 1 and 2) for placement over the water nozzles 30 and 32, respectively.

An additional pair of recesses 74 and 76 are formed on surface 54 of plate 48. Recesses 74 and 76 are also adapted to receive an O-ring gasket 78 and 80 for sealing the water holes 34 and 36, respectively.

For the "92 series" diesel engines, all of the recesses 66, 68, 74 and 76 are of the same size (approximately ⅜ inch in diameter and 1/16 inch deep).

The reverse side 56 of plate 48 is preferably adapted for use in connection with testing the cylinder heads for the "71 series" diesel engines for the sake of economy and versatility. The reverse side 56 clearly includes the same through holes 58 and 60 and, additionally, includes a pair of recesses 82 and 84 for receiving the somewhat larger O-rings that are required to seal the "71 series" water nozzles (not shown). The diameter of recesses 82 and 84 is on the order of 1 1/16 inches, for example. All recesses are approximately 1/16 inch deep.

To present the best mode presently contemplated for carrying out the present invention, the overall height of plate 48 is approximately 6¾ inches, the overall width of plate 48 at its widest point is approximately 3¾ inches, and the plate itself is ½ to ⅝ inch thick.

The O-rings 70, 72, 78 and 80 utilized to seal the water nozzles 30 and 32 and the water holes 34 and 36 may advantageously be identical to those O-rings utilized when the head 10 is bolted to the cylinder block. For example, O-rings 70, 72, 78 and 80 may be identified as part number 5148502 manufactured by Detroit Diesel. Rings which fit within recesses 82 and 84 of the "71 series" plate 56 may be identified, for example, as part number 5186579. It is noted from FIG. 2 that the thickness of O-rings 70 and 72 is greater than the depth of recesses 66 and 68, respectively, in order to maintain planar surface 54 of plate 48 spaced from the surface 11 of head 10.

Figure 7:
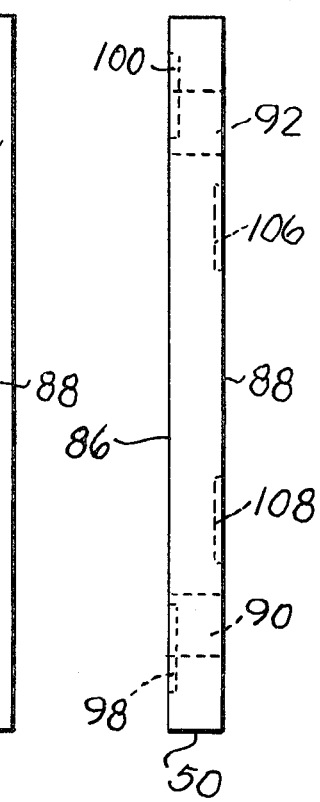
FIG. 7 is a side view of the alternate embodiment illustrated in FIG. 6.
Figure 8:
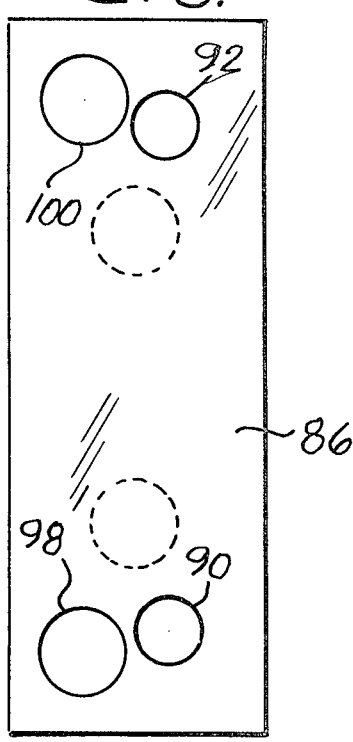
FIG. 8 is a plan view of the reverse side of the alternate embodiment illustrated in FIGS. 6 and 7.

The right end plate 50 mounted on cylinder head 10 is illustrated in greater detail in FIGS. 6 through 8 to which attention is directed. Plate 50 also has two working surfaces 86 and 88, the former being adapted for use with the "series 92" diesel engine cylinder heads, the latter being adapted for use with the "series 71" diesel engine cylinder heads.

Referring to FIG. 8, surface 86 of plate 50 includes a pair of mounting holes 90 and 92, which are preferably ⅝ inch in diameter, for receiving a pair of mounting bolts 94 and 96 (FIG. 1). A pair of recesses 98 and 100 are also provided within which O-rings 102 and 104 (FIG. 1) are positioned for sealing the respective water conduits positioned concentrically thereunder. Recesses 98 and 100 are sized identically to the other recesses for the series 92 plates afore-described.

FIG. 6 illustrates the reverse side 88 which is intended for use as a left side plate for the "71 series" diesel engine cylinder head and includes a pair of recesses 106 and 108 (⅞ inch diameter) for receiving respective sealing rings (part number 5186577).

Figure 9:
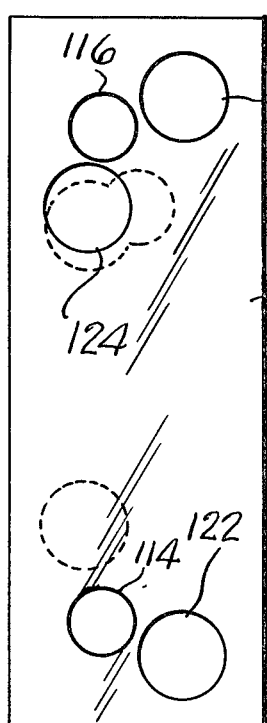
FIG. 9 is a plan view of yet another alternate embodiment of the present invention.
Figure 10:
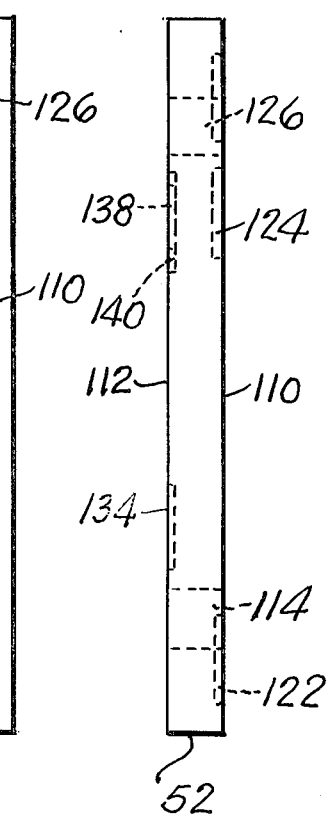
FIG. 10 is a side view of the embodiment illustrated in FIG. 9.
Figure 11:
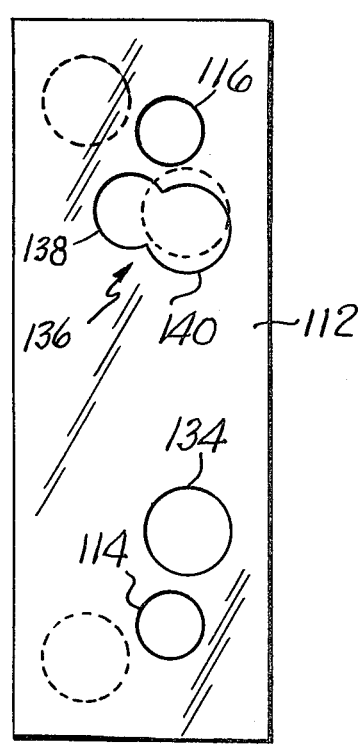
FIG. 11 is a plan view of the rear surface of the embodiment of the present invention illustrated in FIGS. 9 and 10.

End plate 52 which is utilized on the left end of cylinder head 10 is illustrated in greater detail in FIGS. 9 through 11, to which attention is now directed. End plate 52 also has two working surfaces 110 and 112 which are respectively provided for the series 92 and 71 diesel engine cylinder heads. Plate 52 includes a pair of mounting holes 114 and 116 for receiving mounting bolts 118 and 120 (FIG. 1). Shown in FIG. 9 on surface 110 are ⅜ inch diameter recesses 122, 124 and 126 for receiving O-rings 128, 130 and 132, respectively. The O-rings 128, 130 and 132 are provided for sealing two water holes 129 and 133, as well as an oil passage hole 131.

The reverse side 112 of plate 152 is designed especially to be utilized to seal the right side end of a 71 series diesel engine and includes a lower recess 134, approximately ⅞ inch in diameter, for receiving a similarly sized O-ring (part number 5186577). Positioned in the upper portion of side 112 of plate 52, just below mounting hole 116, is a special, figure-eight recess 136 which consists of a pair of overlapping circular recesses 138 (⅝ inch in diameter) and 140 (⅞ inch in diameter). A special, figure-eight O-ring (part number 5183305) is provided for insertion in recess 136.

In using the testing plates of the present invention, the appropriate plates and sides are selected for the particular engine whose cylinder head is desired to be tested. Assuming, for example, that the four-valve, V-8 "92 series" diesel engine cylinder head 10 shown in FIG. 1 is being tested, three identical center plates 48 are required with two end plates 50 and 52. O-rings are inserted into the recesses 66, 68, 74 and 76 of side 54 of the three center plates 48, as well as in recesses 90 and 92 of side 86 of plate 50 and in recesses 122, 124 and 126 of side 110 of plate 52. The three center plates 48 are then bolted on head 10 at the three positions between valve sets 12-14 (indicated in FIG. 1 by plate 46), 14-16, and 16-18 (illustrated in FIG. 1 as having no plate thereat). Plate 50 is then bolted on the right end of head 10, while plate 52 is bolted on the left end.

The advantages of the present invention accrue by virtue of the transparency of the test plates as well as by the use of sealing gaskets no larger than necessary to seal the appropriate water passages. After the plates with O-rings are bolted onto head 10, approximately 60 pounds of fluid pressure is applied to the cylinder head 10 via an inlet water conduit (not shown). The head 10 is then visually inspected, especially in the areas under the plates. In contrast to the prior art techniques and apparatus, if a fracture or crack exists in the areas under the test plates, water leaking therefrom would be readily detectable by sight, and the precise location thereof can be similarly visually determined.

If the cylinder head 10 will not hold pressure for too long a time, or a crack is determined to be present but is not completely visible to the eye, a soap solution may be applied to more precisely determine the location of the fracture or crack so that necessary repairs may be effectuated.

The present invention may be used with equal effectiveness on a four-valve V-6 "92 series" cylinder head by using only two center plates 48 with the end plates 50 and 52. As is apparent from the foregoing, the reverse sides of plates 48, 50 and 52 may be used to test either the V-6 or V-8 "71 series" diesel cylinder heads.

Obviously, numerous modifications and variations of the present invention are possible in light of the above teachings. The plates themselves need not conform to the exact shape shown and described. They may be made of different, equivalent materials, and may have recesses and mounting apertures designed for any desired cylinder head. It is therefore to be understood that within the scope of the appended claims, the invention may be practiced otherwise than as specifically described herein.

I claim as my invention:

1. Apparatus for use in testing an engine cylinder head under fluid pressure to locate possible fractures in the head, said cylinder head including a plurality of interconnected water conduits and a plurality of bores adapted to receive bolts for attaching said cylinder head to the cylinder block, which comprises:

a plurality of test plate means for covering said water conduits, each of said test plate means comprising a substantially rigid, transparent plate having at least two through apertures each adapted to receive one of said bolts for fastening said plate through at least two of said bores in said head, said plate having one side comprising a substantially planar surface positioned in use adjacent but spaced from said cylinder head and including recessed means formed therein for receiving means for sealing those of said water conduits covered by said plate.

2. The apparatus as set forth in claim 1, wherein said recessed means formed in said planar surface of said plate comprises at least one substantially circular recess which is positioned on said planar surface of said plate in concentric alignment with at least one water conduit during use.

3. The apparatus as set forth in claim 2, wherein said sealing means comprises an O-ring gasket adapted to be fitted within said substantially circular recess.

4. The apparatus as set forth in claim 3, wherein the thickness of said gasket is greater than the depth of said recess whereby said gasket projects above said planar surface of said recess when installed therein.

5. The apparatus as set forth in claim 2, wherein said recess is of a diameter slightly larger than that of said conduit.

6. The apparatus as set forth in claim 2, wherein said recessed means further comprises a plurality of substantially circular recesses each positioned on said planar surface of said plate in concentric alignment with one water conduit during use.

7. The apparatus as set forth in claim 1, wherein the reverse side of said substantially rigid, transparent plate comprises a second substantially planar surface which includes further recessed means formed therein for receiving further sealing means.

8. The apparatus as set forth in claim 7, wherein said recessed means formed in said one side of said plate are positioned for use with one particular cylinder head design, while said further recessed means on said reverse side of said plate are positioned for use with a different cylinder head design.

9. The apparatus as set forth in claim 8, wherein said one particular cylinder head design comprises a series 92 Detroit diesel engine cylinder head.

10. The apparatus as set forth in claim 9, wherein said different cylinder head design comprises a series 71 Detroit diesel engine cylinder head.

11. Apparatus for use in fluid pressure testing of an engine cylinder head when dismantled from its engine block to locate possible fractures in the head, said engine cylinder head including a plurality of water conduits having outlets located on one surface of said head and a plurality of bores also opening on said one surface which are adapted to receive bolts for normally securing said cylinder head to the engine block, which comprises: test plate means for covering at least one of said outlets of said water conduits, said test plate means comprising a substantially rigid plate having at least one through aperture adapted to receive one of said bolts for fastening said plate to said head, said plate including a substantially planar surface positioned during use adjacent but spaced from said one surface of said cylinder head, said surface of said plate having a substantially circular recess formed therein, said recess being sized substantially the same as said at least one outlet of said water conduit so as to be concentrically positioned thereover during use.

12. The apparatus as set forth in claim 11, further comprising means positionable within said circular recess for sealing said at least one outlet of said water conduit during use.

13. The apparatus as set forth in claim 12, wherein said sealing means comprises an O-ring gasket.

14. The apparatus as set forth in claim 11, wherein said plate is transparent.

15. The apparatus as set forth in claim 11, wherein said plate means is sized to cover a plurality of outlets of said water conduits and said surface of said plate includes a plurality of substantially circular recesses respectively sized the same as said plurality of outlets so as to be positioned thereover during use.

16. The apparatus as set forth in claim 15, further comprising a plurality of sealing means adapted to fit respectively within said plurality of circular recesses.

17. The apparatus as set forth in claim 16, wherein said sealing means each comprise an O-ring gasket.

18. The apparatus as set forth in claim 11, wherein said circular recess is of a depth less than the thickness of said plate.

19. The apparatus as set forth in claim 11, wherein the reverse side of said substantially rigid plate comprises a second substantially planar surface which includes another substantially circular recess formed therein.

* * * * *